United States Patent [19]

Bronicki et al.

[11] Patent Number: 4,829,196
[45] Date of Patent: May 9, 1989

[54] ENERGY-SAVING PRESSURE REDUCER

[75] Inventors: Lucien Y. Bronicki, Rehovot, Israel; Gerard Lehman, Paris, France

[73] Assignee: Ormat Turbines (1965) Ltd., Yavne, Israel

[21] Appl. No.: 286,025

[22] Filed: Jul. 22, 1981

[51] Int. Cl.⁴ ............................................. F03B 13/00
[52] U.S. Cl. ........................................ 290/54; 290/43
[58] Field of Search ............... 290/1 R, 4 R, 4 D, 43, 290/54; 60/371, 648; 48/191

[56] References Cited

U.S. PATENT DOCUMENTS

| | | | |
|---|---|---|---|
| 4,220,009 | 9/1980 | Wenzel | 60/648 |
| 4,345,159 | 8/1982 | Atencio | 290/43 |
| 4,369,373 | 1/1983 | Wiseman | 290/54 |

*Primary Examiner*—William M. Shoop, Jr.
*Assistant Examiner*—W. E. Duncanson, Jr.
*Attorney, Agent, or Firm*—Sandler & Greenblum

[57] ABSTRACT

The pressure of fluid supplied by a high-pressure line is reduced to a lower pressure suitable for a low-pressure utilization device located in an environment having an electrical grid by interposing a fluid motor between the high-pressure line and the low-pressure utilization device such that operation of the latter causes the high-pressure fluid to operate the motor and to exhaust into the utilization device. The fluid motor drives an asynchronous generator whose output is connected to the electrical grid through a switch whose state is normally open. The switch is maintained in a closed state only during operation of the motor by providing, for example, a pressure sensor in the exhaust of the motor for sensing the passage of fluid through the motor. As long as the utilization device is furnished with low-pressure fluid, the switch is closed and the output of the generator is fed directly into the power grid of the local environment, thereby reducing the amount of power being supplied to the local environment by the power company.

12 Claims, 2 Drawing Sheets

ENERGY-SAVING PRESSURE REDUCER

TECHNICAL FIELD

This invention relates to an energy-saving pressure reducer for use with a high-pressure fluid line in an environment having an electrical grid.

BACKGROUND ART

The transportation of fluids such as steam, compressed air, natural gas, and the like, from a centrally located source to remotely located utilization devices is usually carried out at relatively high pressure to minimize pipe size, amount of insulation, etc. For example, a utilization device in the form of a steam drier operates on low-grade steam; and to minimize the cost of transporting steam from a central power plant, high-quality steam (i.e., steam at a relatively high temperature and pressure) is piped to driers at remote locations in a factory where the high-pressure steam is passed through pressure reducers, usually throttling valves, before being applied to the driers. Each pressure reducer reduces the pressure of the steam to a level compatible with the drier, but throttling converts some of the heat in the high-quality steam in kinetic energy which causes "wire-drawing" in the throttling valve and superheats the low-quality steam produced by the throttling. As a consequence of its being superheated, the low-quality steam requires larger heat transfer surfaces than saturated steam.

A conventional approach to minimize such losses is to apply the high-grade steam produced efficiently in a boiler to a steam turbine, whose exhaust supplies the processed steam for the driers. However, this necessitates placing the driers in the immediate vicinity of the turbine to avoid the expense of long runs of relatively large pipe carrying relatively low-quality steam, and to minimize insulation of such pipes. This is not always practical; and for this reason, localized pressure reducers are associated with low-pressure fluid utilization devices in many industrial processes; and this results in a significant waste of the potential of the energy in the steam.

It is therefore an object of the present invention to provide a new and improved localized pressure reducer for use with a high-pressure fluid line in an environment having an electrical grid wherein the pressure reducer does not suffer from the deficiencies of previously known pressure reducers.

DISCLOSURE OF THE INVENTION

In accordance with the present invention, the pressure of a fluid supplied by a high-pressure supply line is reduced to a lower pressure suitable for a low-pressure utilization device located in an environment having an electrical grid by interposing a fluid motor between the high-pressure fluid and to exhaust into the utilization device. The fluid motor drives an asynchronous generator whose output, which is substantially equal to the energy extracted from the high-pressure fluid in order to reduce this pressure to a level compatible with the utilization device, is connected to the electrical grid through a switch whose state is normally open. The switch is maintained in a closed state only during operation of the motor by providing, for example, a pressure sensor in the exhaust of the motor for sensing the passage of fluid through the motor. As long as the utilization device is furnished with low-pressure fluid, the switch remains closed and the output of the generator is fed directly into the power grid of the local environment, thereby reducing the amount of power being supplied to the local environment by the power company. In other words, the energy taken from the high-pressure fluid in order to reduce its pressure is fed back into the electrical grid instead of being wasted in a conventional pressure reducer.

As an example, in a factory having a centrally located large-capacity air compressor that furnishes compressed air to a production line having many air-operated tools, it is conventional to pipe the high-pressure air to a location adjacent each air-operated tool, and to supply a coupling for connection to the tool through a pressure reducer. When the pressure reducer used is made in accordance with the present invention, the generator is wired permanently into the electrical grid of the factory, and use of the tool is accompanied by the flow of high-pressure air through the motor of the pressure reducer, thereby driving the generator which produces a power input into the grid.

The use of an asynchronous generator is important because such a device requires no separate excitation, but utilizes the power grid itself as its excitation. Thus, there is no problem in starting an asynchronous generator, because it will not interact with the power grid until the generator is driven close to synchronous speed, at which time its frequency will lock into the power grid frequency. Furthermore, the asynchronous generator cannot be driven by the power grid as a motor because the generator is disconnected from the power grid as soon as the utilization device is deactivated and the motor driving the asynchronous generator is deprived of high-pressure fluid. Finally, an asynchronous generator requires no reverse current power switch, as required by a synchronous generator, to protect it in the event of loss of the power grid inasmuch as an asynchronous generator can deliver no power in the absence of the grid.

BRIEF DESCRIPTION OF DRAWINGS

Embodiments of the present invention are disclosed the accompanying drawings, wherein.

DETAILED DESCRIPTION

Figure 1:
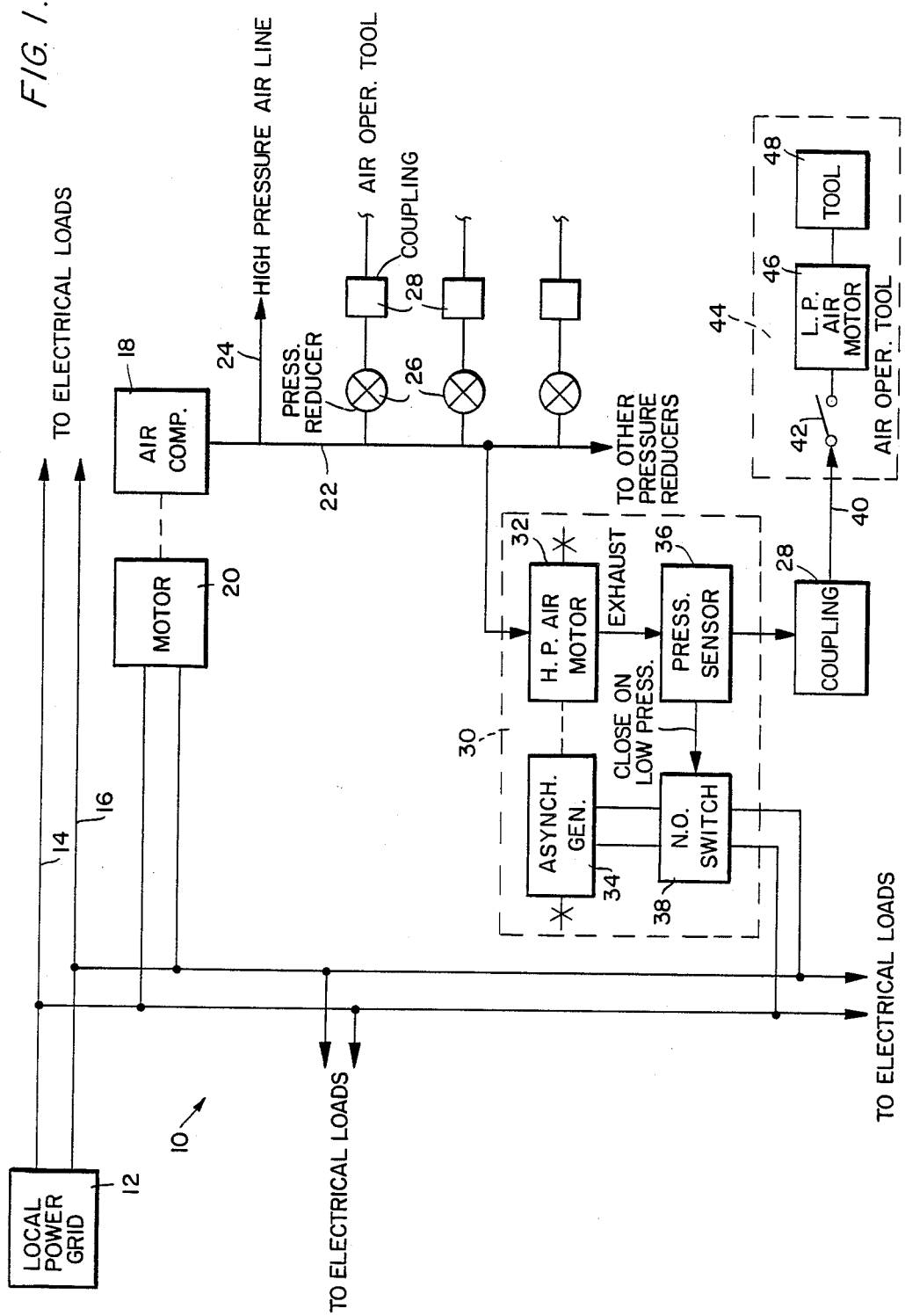
FIG. 1 is a schematic block diagram of a factory having a centrally located air compressor feeding a high-pressure compressed air line to which an energy-saving pressure reducer according to the present invention is connected.

Referring now to FIG. 1, reference numeral 10 designates a factory, in schematic form, having a local power grid 12 spatially distributing power throughout the factory by associated power leads 14, 16. It should be understood that FIG. 1 is a schematic illustration, and that, generally speaking, the power grid may be in the form of a three- or four-wire distribution system; but the invention is applicable to all types of power grids in addition to the type shown in FIG. 1.

The factory contains high-volume air compressor 18 driven by electrical motor 20 connected to the power grid through a suitable arrangement of contactors and switches (not shown) which are conventionally associated with large-scale electric motors. Air compressor 18 has, as its output, a high-pressure air line 22 by which high-pressure air is piped throughout the factory as indicated schematically by line 24. At various work stations in the factory, conventional pressure reducers 26 are teed into line 22 for the purpose of permitting air-operated tools to be coupled to the high-pressure line through the reducer. To this end, conventional couplings 28 are connected to the outlet of the pressure reducers. As is well known, when an air hose is inserted into the coupling, the air the line is connected to a valve at the inlet of the air-operated tool so that the operator may selectively operate the tool by actuating the valve. When this valve is actuated, air from the compressor flows through the high-pressure line into the pressure reducer which reduces the pressure and supplies air to the tool at a pressure compatible with the tool.

All of the energy extracted from the high-pressure air by the pressure reducer is lost to the system; and, in a large-scale operation with many air-operated tools distributed throughout the factory, this loss can be a considerable one. The energy-saving pressure reducer of the present invention, indicated schematically by reference numeral 30, comprises high-pressure air motor 32, asynchronous generator 34, pressure sensor 36, and normally open switch 38. High-pressure air delivered by line 22 is applied to motor 32, which exhausts into conventional coupling 28 through pressure sensor 36. When air line 40 is disconnected from coupling 28, the flow of air from line 22 through motor 32 is blocked. When air line 40 is connected to coupling 28, and valve 42 of air-operated tool 44 is unactuated (i.e., open), the flow of high-pressure air is blocked until the valve is manually closed. On closure of valve 42, high-pressure air from line 22 flows through motor 32, and the exhaust of the motor, at a lower pressure, flows through sensor 36 and coupling 28 into low-pressure air motor 46 of tool 44 for the purpose of operating tool head 48. Such tool head may be, for example, a chuck for receiving different types of tools used in a production line.

Asynchronous generator 34 is coupled to and rotates with motor 32. As a consequence, when air line 40 is connected to coupling 28 and air flows into air-operated tool 44, the low-pressure air exhausted from motor 32 is sensed by pressure sensor 36, which responds by closing normally open switch 38. This switch remains closed as long as air is flowing through motor 32, which occurs as long as valve 42 is closed by the operator of tool 44.

The output of generator 34 is applied through normally open switch 38 to the power grid. As a consequence of the inherent operation of an asynchronous generator, the flow of air through motor 32 will cause generator 34 to operate as a generator with excitation supplied by the power grid. Thus, the energy extracted from the high-pressure air in dropping the pressure from the line pressure contained in high-pressure line 22 to the low pressure level compatible with motor 46 of tool 44, is converted by generator 34 into electrical energy which is fed back into the power grid, thereby reducing the amount of power received from the electrical power company and supplied to power grid 12.

When the operator of tool 44 releases valve 42, thereby disconnecting air motor 46 from the high-pressure air line, the flow of air through motor 32 is interrupted, causing the pressure in the exhaust of the motor to rise to essentially the high pressure level found in line 22. Pressure sensor 36 is responsive to this condition, causing switch 38 to open and disconnect generator 34 from the power grid. This is an important aspect of the present invention, because unless the generator were disconnected from the power grid on termination of fluid flow through motor 32, the power grid would drive generator 34 as a motor, thereby extracting power from the power grid and reducing the effectiveness of the pressure reducer 30.

Figure 2:
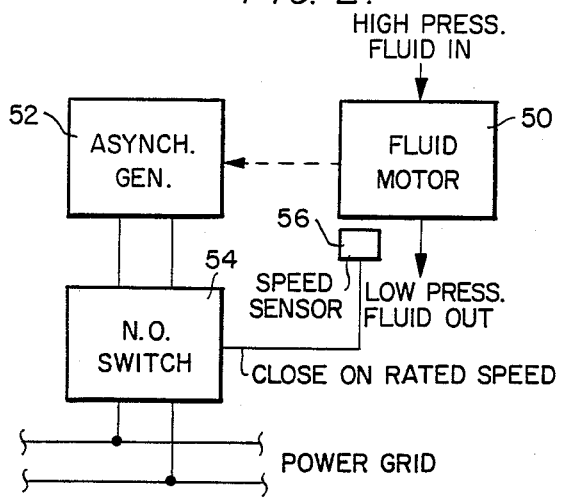
FIG. 2 is a block diagram of a second embodiment of an energy-saving pressure reducer.

While the invention described above deals with an air compressor and a high-pressure air line, the present invention is applicable to other situations involving high-pressure fluid. For example, the high-pressure fluid could be steam as well as compressed air, and could be natural gas or other type of fluid which is highly pressurized and distributed from a central location to remotely located utilization devices. In such case, the prime mover of the energy-saving pressure reducer would be a fluid motor as indicated in FIG. 2 by reference numeral 50. The fluid motor serves as a means for converting the high-pressure fluid entering the motor to a low-pressure fluid that exhausts from the motor at a pressure compatible with a utilization device downstream of motor 50. As shown in FIG. 2, motor 50 drives asynchronous generator 52, whose output is connected to a power grid through normally open switch 54. In the embodiment shown in FIG. 2, switch 54 is closed in response to the output of speed sensor 56, which may be mechanically or magnetically coupled to motor 50 for sensing its rotational speed. Switch 54 is closed when sensor 56 senses rated speed of motor 50, thereby connecting generator 52 to the power grid. In the event that the fluid exhausted by motor 50 is interrupted, thereby changing the motor's speed, this change is sensed by sensor 56 and serves to reopen switch 54, thereby disconnecting generator 52 from the power grid and preventing the generator from operating as a motor driven from the power grid.

Figure 3:
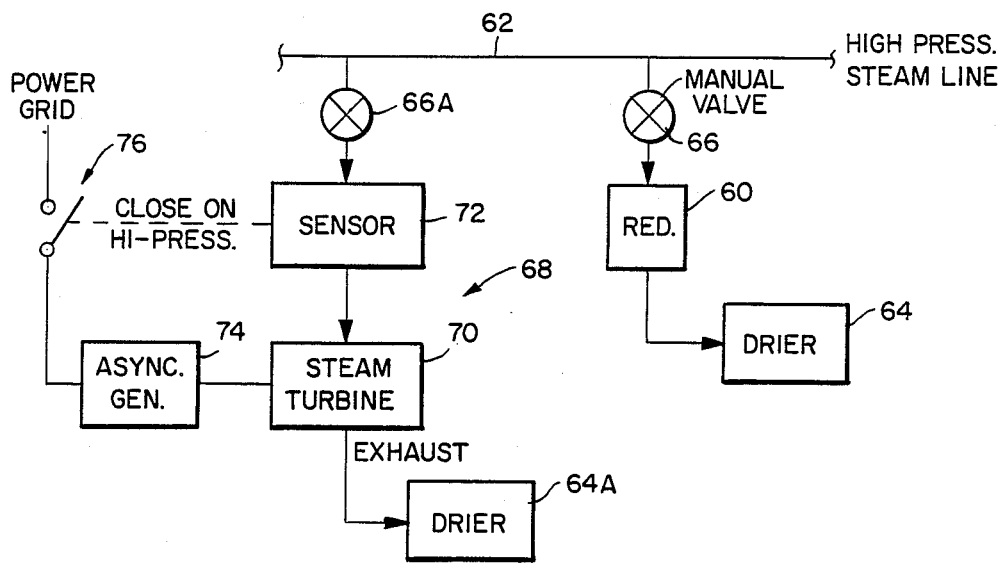
FIG. 3 is a further embodiment of an energy-saving pressure reducer according to the present invention.

Referring now to FIG. 3, a specific example of the system is shown in which a high-pressure steam line supplies processed steam to a drier or other similar utilization device operating on low-quality steam. FIG. 3 shows a conventional pressure reducer valve 60 interposed between high-pressure steam line 62 and drier 64. Valve 66 between line 62 and the pressure reducer valve 60 operates to selectively connect drier 64 to the steam line 62.

An energy-saving pressure reducer 68 in this is also shown in FIG. 3. Reducer 68 comprises a steam turbine 70 connected to the high-pressure steam line 62 by valve 66A, a pressure sensor 72 being interposed between the valve and the turbine. Exhaust from the turbine is piped to drier 64A; and asynchronous generator 74 is coupled to the steam turbine for rotation therewith. The output of generator 74 is applied to the power grid associated with the environment in which the driers are used through normally open switch 76, which is operated by sensor 72. That is to say, sensor 72 senses the presence of high-pressure steam when valve 66A is opened, and is effective to close switch 76, thereby connecting generator 74 to the power grid. A suitable time delay may be interposed between the sensing of high-pressure steam by sensor 72 and the time at which switch 76 is closed for the purpose of allowing turbine 70 to reach operating speed.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

I claim:

1. An energy-saving pressure reducer for use with a high-pressure fluid line in an environment having an electrical grid, the reducer comprising:
   (a) a selectively operable fluid motor having a high-pressure inlet for connection to the high-pressure fluid line, and a low-pressure exhaust outlet for connection to a low-pressure fluid utilization device, selective operation of said motor resulting in the flow of fluid through the motor causing it to rotate;
   (b) an asynchronous generator coupled to the fluid motor for rotation therewith;
   (c) a normally open switch for connecting the output of the generator to the electrical grid; and
   (d) a pressure sensor responsive to the flow of fluid through the motor for closing the switch only during the time that the motor is operated and fluid flows through the motor.

2. An energy-saving pressure reducer according to claim 1 wherein the sensor senses the pressure at the low-pressure exhaust of the motor and closes the switch only when the pressure in the low-pressure exhaust is consistent with fluid flow through the motor.

3. An energy-saving pressure reducer according to claim 1 wherein the sensor senses the speed of rotation of the motor and closes the switch only when the motor has a predetermined speed.

4. An energy-saving pressure reducer according to claim 1 wherein the sensor means senses the pressure at the high-pressure inlet to the motor and closes the switch only when the pressure in the high-pressure inlet is consistent with fluid flow through the motor.

5. An energy-saving pressure reducing according to claim 1 wherein the fluid is air and the high-pressure fluid line is an air line.

6. An energy-saving pressure reducer according to claim 2 wherein the fluid is steam and the high-pressure fluid line is a steam line.

7. An energy-saving pressure reducer according to claim 5 wherein the fluid motor is a steam turbine.

8. An energy-saving pressure reducer according to claim 6 wherein a valve is interposed between the steam line and the turbine and a sensor is interposed between the valve and the inlet to the turbine for closing the switch when the presence of high-pressure steam at the inlet to the turbine is sensed.

9. An energy-saving pressure reducer according to claim 5 including a normally closed coupling at the outlet of the exhaust outlet of the fluid motor, and a sensor is interposed between the exhaust and the coupling for closing the switch when low-pressure air is sensed.

10. An energy-saving pressure reducer for use with a high-pressure fluid line in an environment having an electrical grid, the reducer comprising:
    (a) a fluid motor having a high-pressure inlet for connection to the high-pressure fluid line, and a low-pressure exhaust outlet for connection to a low-pressure fluid utilization device;
    (b) a selectively actuatable switch for selectively connecting the high-pressure fluid line to the high-pressure inlet of the motor, closing of said switch resulting in the flow of fluid through the motor causing it to rotate;
    (c) an asynchronous generator coupled to the fluid motor for rotation therewith;
    (d) a normally open switch for connecting the output of the generator to the electrical grid; and
    (e) means responsive to operation of the motor for closing said normally open switch only during the time that the motor is operated.

11. An energy-saving pressure reducer according to claim 10 including a pressure sensor responsive to the application of high pressure fluid to the motor for closing said normally open switch.

12. An energy-saving pressure reducer according to claim wherein said selectively actuatable switch is manually operable.

* * * * *